Patented Aug. 6, 1940

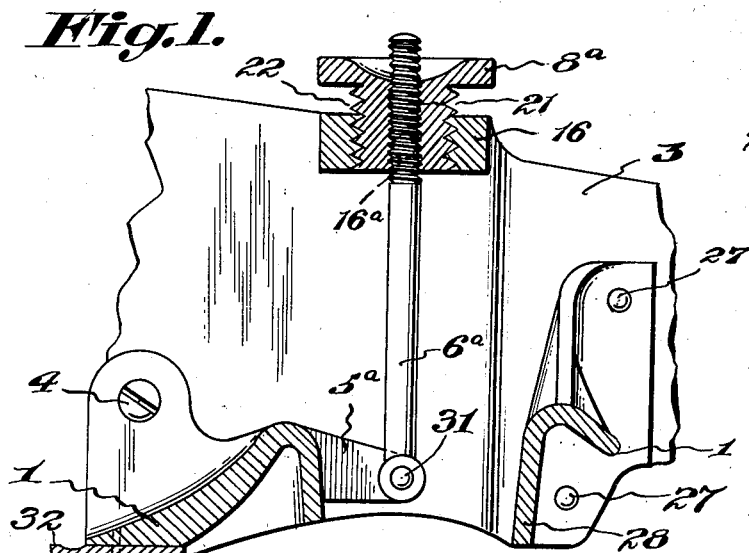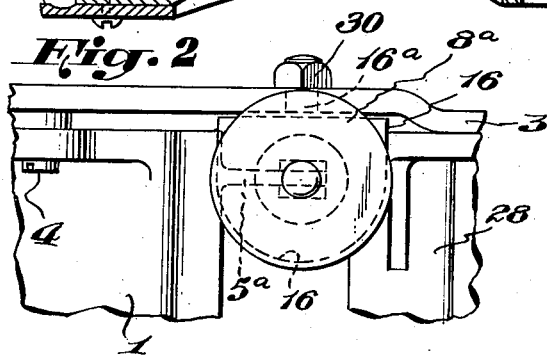

2,210,794

UNITED STATES PATENT OFFICE 2,210,794

MEANS FOR ADJUSTING THE CUTTER BARS OF MOWING MACHINES

Allan S. Cambridge, Dalrachney Station, Omarama, New Zealand

Original application June 2, 1939, Serial No. 277,064, now Patent No. 2,197,295, dated April 16, 1940. Divided and this application August 30, 1939, Serial No. 292,720. In Great Britain July 13, 1938

5 Claims. (Cl. 56—294)

The present invention relates to grass cutting machines often referred to as lawn mowers and more particularly pertains to means for adjusting the angular position of the cutter bar with respect to the revolving helical blades of such machines. This application is a division of my copending application Serial No. 277,064 filed June 2, 1939, now Patent No. 2,197,295, granted April 16, 1940.

An object of the invention resides in the provision of means for adjusting the angular position of the cutter bar of a lawn mower by the rotation of a handwheel or knob which may be manually turned to effect the adjustment without the aid of separate tools.

Another object of the invention resides in providing a rigid reinforcement for the rear portion of the frame members of the mower whereby the cutter bar may be adjustably mounted therein without relying on the cutter bar as a part of the reinforcing frame structure.

A still further object of the invention resides in providing means for adjusting the angular positions of the cutter bar wherein the adjustment may be varied in coarse and fine stages.

Other and further features and objects of the invention will be more apparent to those skilled in the art upon a consideration of the accompanying drawing and the following description wherein several exemplary embodiments of the invention are disclosed.

In the drawing:

Fig. 1 is a sectional elevational view of part of a mower illustrating one form of the invention applied thereto.

Fig. 2 is a plan view of the parts shown in Fig. 1.

Fig. 3 is a detailed elevational view partly in section showing a modification of the cutter bar adjusting means.

Fig. 4 is an elevational view of the hand wheel shown in Fig. 1 illustrating the relationship of the threads thereon to the threads of the bolt.

Fig. 5 is an elevational view of the hand wheel of Fig. 3 showing the relationship of the threads thereof with respect to the threads carried by the bolt.

Referring to the drawing there is shown at 1 a cutter bar provided at the ends thereof with lugs by means of which the cutter bar is mounted for pivoting movement on the frame members 3 of the mower. The helical blades of the lawn mower (not shown) are mounted in a conventional manner so that the helical blades cooperate with the cutter bar 1 to perform the cutting operation. The cutter bar 1 is pivotally mounted on the frame members 3 by means of bolts or screws 4 arranged between the forward or cutting edge 32 and the rear edge of the cutter bar as shown in Figs. 1 and 3.

The rear edge of the cutter bar is provided with a projection or lug 5a as shown in Figs. 1 and 2. A bolt or rod 6a is pivotally attached to the lug 5a by means of a pin 31. The bolt 6a extends upwardly from the rear edge of the cutter bar 1 and the upper end of the bolt is provided with threads adapted to be engaged by the internal threads 21 of a hand wheel 8a which also carries external threads 22 for engagement with an internally screw threaded nut 16 pivotally attached by means of a bolt 16a and a nut 30 to the side frame member 3 of the mowing machine, to allow for movement of the bolt 6a caused by the arcuate travel of the rear edge of the cutter bar 1.

The screw threads 22 between the handwheel 8a and the nut 16, may be of a greater pitch or quicker acting than the screw threads 21 between the bolt 6a and the handwheel 8a, or one set of threads may be right handed, and the other pair left handed as shown in Fig. 4, so as to enable a fine adjustment of the cutter bar 1, in relation to the revolving cutter blades to be obtained with relatively little movement of the handwheel 8a.

In the form of adjusting means illustrated in Fig. 3 the bolt or rod 6b is threaded to screw into or through a member pivotally attached to the cutter bar 1, such as a pin 23 adapted to rock in a lug or lugs 24 fixed to the cutter bar. The handwheel 8b in this case is secured on the bolt 6b against turning movement thereon, and provided with external threads 25 adapted to screw into the bracket or nut 16 pivotally attached at 16a to side frame member 3 of the machine. In this embodiment the threads 25 between the pivotal bracket or nut 16 and the handwheel 8b may be of a greater pitch or quicker acting than the threads 26, or of reverse pitch with respect to the threads 26 between the bolt 6b and the pin 23 as shown in Fig. 5, to enable adjustment of the cutter bar to be obtained, as hereinafter described.

It will be understood that the adjusting means described as being arranged at one end of the cutter bar 1 may be provided at both ends thereof. By the use of the adjusting means described, convenient access is obtained to the parts controlling the adjustment.

It is essential for the successful operation and use of the adjusting means described, that the frame of the machine be perfectly rigid so as to prevent twisting thereof and for this purpose the frame is braced or stiffened by a cross bar 28 of suitable section as shown in Fig. 1. The cross bar 28 is preferably secured to the frame members 3 by means of bolts 27 so that the rear end of the mower frame is sufficiently rigid to prevent twisting thereof without relying on the cutter bar as means for reinforcing the frame. The rear portion of the frame may thus be regarded as being U-shaped and providing a unitary cage within which the cutter bar and the adjusting means are mounted.

In adjusting the position of the cutter bar with the first embodiment and if it is desired to move the front cutting edge 32 towards the helical blades of the mower the hand wheel 8a is rotated to move the same downwardly in the bracket nut 16. The bolt or rod 6a is thus moved downwardly so that the lug 5a and the rear edge of the cutter bar 1 are forced downwardly. Such downward movement of the rod 6a causes the cutter bar to pivot on the screws 4 whereby the front cutting edge 32 is moved upwardly towards the helical cutting blades (not shown). During rotation of the hand wheel 8a the same also turns on the bolt or rod 6a, and the fine threads 21 of a reverse pitch with respect to the threads 22 will move the bolt 6a upwardly in the hand wheel 8a during the downward movement of the hand wheel in the bracket nut 16. Thus the total downward movement of the bolt 6a with respect to the frame 3 will be less than the distance which the hand wheel has moved in the bracket nut 16 and a very fine adjustment of the cutter bar with respect to the helical cutting blades will be obtained. A similar reversed series of steps will take place when it is desired to move the front edge 32 of the cutter bar away from the helical blades.

It will be noted that lower and upper ends of the bolt 6a are free to pivot during the swinging movement of the cutter bar during the adjustment thereof. In other words the rod 6a may pivot on the pin 31 and the bracket nut 16 is pivotable on the bolt 16a so that there is no binding of the threads 21 and 22 when the rear edge of the cutter bar moves in an arcuate path during the adjustment thereof.

Similar minute adjustment of the cutter bar 1 is obtained by the second embodiment and downward movement of the hand wheel 8b in the bracket nut 16 will force the rear edge of the cutter bar downwardly. During rotation of the hand wheel 8b to provide such downward movement the rod 8b will be rotated in the pin 23. The fine threads 26 of opposite pitch with respect to the threads 25 will cause the pin 23 to be moved upwardly on the threads 26 and the total downward movement of the rear edge of the cutter bar will be less than the movement between the hand wheel 8b and the bracket nut 16.

The adjusting mechanism shown in Fig. 3 also provides for pivoting of both the upper and lower ends of the bolt or rod 6b so that the threads 25 between the hand wheel 8b and the bracket nut 16 and the threads 26 between the rod 6b and the pin 23 are free to move without binding even though the rear edge of the cutter bar moves in an arcuate path during the adjustment thereof.

While the invention has been described with reference to specific constructional details it is to be understood that changes may be made therein by those skilled in the art. Such modifications may be made without departing from the spirit and scope of the invention as set forth in the appended claims.

I claim:

1. In a mowing machine having a reel provided with a plurality of cutting blades, a frame, a bar cooperating with said blades and having a front cutting edge and a rear edge pivotally mounted intermediate said edges on the frame, a rod pivotally connected at one end to the rear edge of said bar, a bracket nut pivotally carried by the frame, said rod having a threaded end portion adjacent said bracket nut, a handwheel having threads engaging the threads of said rod, a second set of threads carried by said hand wheel engaging the threads of said bracket nut, and said second set of threads being of an opposite pitch with respect to the first mentioned threads of the hand wheel.

2. In a mowing machine having a reel provided with a plurality of cutting blades, a frame, a bar cooperating with the reel blades and having a front cutting edge and a rear edge pivotally mounted intermediate said edges on the frame, a lug carried by the rear edge of the bar, a pin rotatably mounted in said lug, a rod having a threaded end portion, said pin having a threaded opening for receiving the threaded end of the rod, a bracket nut pivotally carried by the frame having threads of a reversed pitch with respect to the first mentioned threads, and a handwheel secured to the rod having threads matching and engaging the threads of the bracket nut.

3. In a mowing machine having a reel provided with a plurality of cutting blades, a frame, a bar cooperating with said blades and having a front cutting edge and a rear edge pivotally mounted intermediate said edges on the frame, a rod pivotally connected at one end to the rear edge of said bar, a bracket having a threaded opening therein, a bolt pivotally supporting the bracket on the frame, said rod having a threaded end portion extending through the opening in said bracket, a handwheel having threads engaging the threads of said rod, said handwheel having a second set of threads of greater pitch than the first mentioned threads engaging the threads of said bracket, and the second set of threads being of an opposite pitch with respect to the pitch of the threads of the handwheel engaging said rod.

4. In a mowing machine having a reel provided with a plurality of cutting blades, a bar cooperating with the reel blades and having a front cutting edge and a rear edge pivotally mounted intermediate said edges on the frame, a lug carried by the rear edge of the bar, a pin rotatably mounted in said lug, a rod having a threaded end portion, said pin having a threaded opening for receiving the threaded end of the rod, a bracket pivotally carried by the frame having threads of a greater pitch than the first mentioned threads, a handwheel secured to the rod having threads engaging the threads of the bracket, and the threads of the bracket being reversed in pitch with respect to the pitch of the threads carried by the rod.

5. In a mowing machine having a reel provided with a plurality of cutting blades the combination of, a frame, a bar for cooperating with said blades having a front cutting edge and a rear edge pivotally mounted intermediate said edges on said frame, a rigid lug projecting from the rear edge of said cutter bar, a rigid rod, a pin pivotally connecting said rod to said lug, a bracket nut having a threaded opening therein, a bolt projecting laterally from said bracket nut pivotally supporting the bracket nut on said frame, a hand wheel, threads carried by the handwheel engaging the threads of said bracket nut, said handwheel having an opening therethrough with the axis thereof arranged at a right angle to the axis of said bolt, the axis of said opening intersecting the axis of said bolt, and said rod being connected to the handwheel within said opening.

ALLAN S. CAMBRIDGE.